United States Patent [19]
Falk et al.

[11] Patent Number: 5,433,014
[45] Date of Patent: Jul. 18, 1995

[54] DIGITAL TAPE RULE WITH TRANSMITTER

[76] Inventors: David C. Falk, 7200 Stonehenge Dr., Suite 211, Raleigh, N.C. 27613; Glenn O. Weaver, 2104 Royal Oaks Dr., Raleigh, N.C. 27615

[21] Appl. No.: 308,684

[22] Filed: Sep. 19, 1994

[51] Int. Cl.⁶ .................. G01B 3/10; G08C 17/00
[52] U.S. Cl. .................. 33/763; 33/755; 33/759; 33/760; 455/66
[58] Field of Search .......... 33/759, 760, 761, 762, 33/763, 755; 455/66

[56] References Cited

U.S. PATENT DOCUMENTS

| | | | |
|---|---|---|---|
| 4,366,623 | 1/1983 | Bergqvist . | |
| 4,586,150 | 4/1986 | Budziak et al. . | |
| 4,852,264 | 8/1989 | Shimizu et al. | 33/832 |
| 5,046,066 | 9/1991 | Messenger | 455/66 X |
| 5,175,869 | 12/1992 | Murata | 455/66 |
| 5,286,972 | 2/1994 | Falk et al. | 33/763 X |
| 5,335,522 | 10/1994 | Demange | 455/66 X |

FOREIGN PATENT DOCUMENTS

| | | | |
|---|---|---|---|
| 0298111 | 12/1988 | Japan | 33/755 |
| 0214011 | 9/1991 | Japan | 33/763 |
| 2217459 | 10/1989 | United Kingdom | 33/763 |

*Primary Examiner*—Alvin Wirthlin
*Attorney, Agent, or Firm*—Rhodes, Coats & Bennett

[57] ABSTRACT

A digital tape measure includes a transmitter for transmitting measurements to a remote location. The tape measure includes a housing, a flexible tape having a series of optical markings mounted within the housing, an optical sensor for sensing the optical markings when the tape is extended or retracted, a logic circuit operatively connected to the sensor for providing a digital signal representative of the distance measured, and a transmitter operatively connected to the logic circuit for transmitting the digital signal to the remote location. A receiving unit is provided at the remote location for receiving, storing, and displaying the measurements.

9 Claims, 6 Drawing Sheets

DIGITAL TAPE RULE WITH TRANSMITTER

FIELD OF THE INVENTION

This invention relates generally to flexible tape measures, and more particularly, to a digital tape measure having means for transmitting measurements to a remote location.

BACKGROUND OF THE INVENTION

In wood-frame construction, it is not uncommon for a framing crew to have a designated saw operator to cut lumber for a plurality of framers. The framers "call-out" measurements to the saw operator who cuts the lumber to the desired specifications. The cut lumber is then passed to the framers who use the lumber to build the frame. This "call-out" method works satisfactorily at small construction sites. However, there are a number of disadvantages to the "call-out" method, particularly at large construction sites.

One disadvantage of the "call-out" method is that it requires the framer and the saw operator to be in contact with one another. If the sawing station is set up on one side of a construction site, framers on the opposite side of the same construction site may be out of range of the saw operator. In such cases, the framers must move to a point closer to the saw operator in order to "call-out" their measurements, and then return back to their original location. The need to move from one location on the construction site to another location in order to "call-out" measurements reduces the productivity of the framer.

Another disadvantage of the "call-out" method involves the ambient noise at construction sites. Construction sites tend to be noisy making verbal communication between a framer and the saw operator difficult. As a result of the ambient noise at the construction site, miscommunication between the saw operator will sometimes occur. Such miscommunications result in lumber being cut to the wrong length. This results in a significant amount of waste in both time and material.

Another problem in wood-frame construction which is not related to the "call-out" method is that the framers sometimes misread their tape measures. Such misreadings result in lumber being cut to the wrong length. In addition to the obvious material waste, time is wasted attempting to install the incorrectly cut lumber, retaking the measurements, and recutting lumber to the correct length.

SUMMARY AND OBJECTS OF THE INVENTION

The present invention relates to a digital tape measure having a built-in radio transmitter for transmitting measurements to a remote location on a construction site. The remote location will typically be the site of a sawing station. A display unit at the sawing station receives and stores the measurements transmitted. The measurements are displayed for use by the saw operator.

The tape measure includes a housing and a flexible rule which is wound on a retractable coil disposed within the housing. The flexible rule is provided with a series of optical markings at predetermined increments corresponding to a fixed unit of measurement. The optical markings are detected by a photoelectric sensing means disposed within the housing when the flexible rule is extended or retracted. The photoelectric sensing means is operatively connected to a logic circuit which maintains a count indicative of the distance measured. A liquid crystal display on the housing displays the measurement. Input means are also provided to enable the person taking measurements to enter the number of pieces needed for each length measured. Data storage means may also be provided to enable sequential measurements to be stored and transmitted as a batch rather that individually.

One advantage of the tape rule of the present invention is that it enables measurements to be transmitted to a saw operator without visual or aural contact between the framer and the saw operator. Thus, the framers are not required to move from one location to another in order to communicate with the saw operator.

The present invention is also advantageous in that it reduces the likelihood of miscommunication between the framer and the saw operator. The tape measure of the present invention does not require manual readings of the measurement by the framer. The processor automatically keeps track of the measurement whenever the rule is extended or retracted. Human reading of the tape, however, may be used as a means of verifying the displayed reading with the measurement made prior to transmitting the measurement to the saw operator.

Another advantage of the present invention is that transmission of measurements from the framer to the saw operator are not effected by ambient noise. Thus, the present invention virtually eliminates the possibility of miscommunication between the framer and the saw operator due to a noisy work environment.

Other objects and advantages of the present invention will become apparent and obvious from a study of the following description and the accompanying drawings which are merely illustrative of such invention.

DETAILED DESCRIPTION OF THE INVENTION

Figure 1:
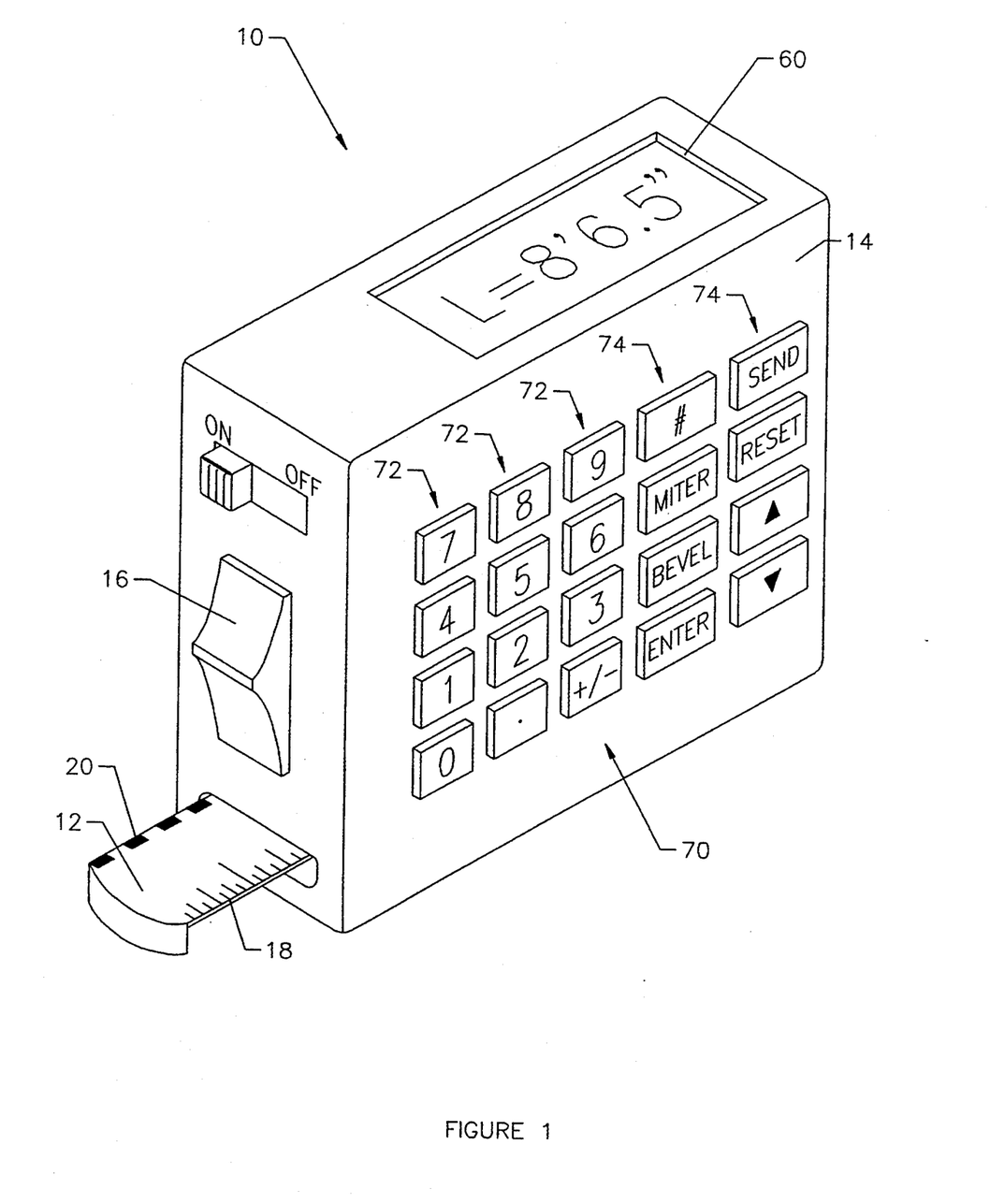
FIG. 1 is a perspective view of the digital tape measure of the present invention.

Referring now to the drawings, and particularly to FIG. 1, the digital tape measure of the present invention is shown therein and indicated generally by the numeral 10. The digital tape measure 10 comprises a flexible rule 12 which is mounted in conventional manner within a housing 14. Typically, the flexible rule 12 is wound around a spring-loaded reel (not shown). The spring-loaded reel automatically retracts the flexible rule 12 into the housing 14. A lock 16 is mounted on the front of the housing for locking the flexible rule 12 in an extended position relative to the housing 14.

The flexible rule 12 includes a human readable scale 18 along one edge thereof. The human readable scale 18 may be in English units or in metric units. The opposite edge of the flexible rule 12 is provided with a series of optical marks 20. The optical marks 20 consist of dark areas of a predetermined length separated by light areas of the same length. The length of the optical marks 20 correspond to the minimum unit of measure being used. For example, if the minimum unit of measure being measured is ⅛", then the light and dark areas would be ⅛" in length. A photoelectric sensing means 22, shown in FIG. 2, is used to detect the optical marks 20 when the flexible rule 12 is extended or retracted.

Figure 2:
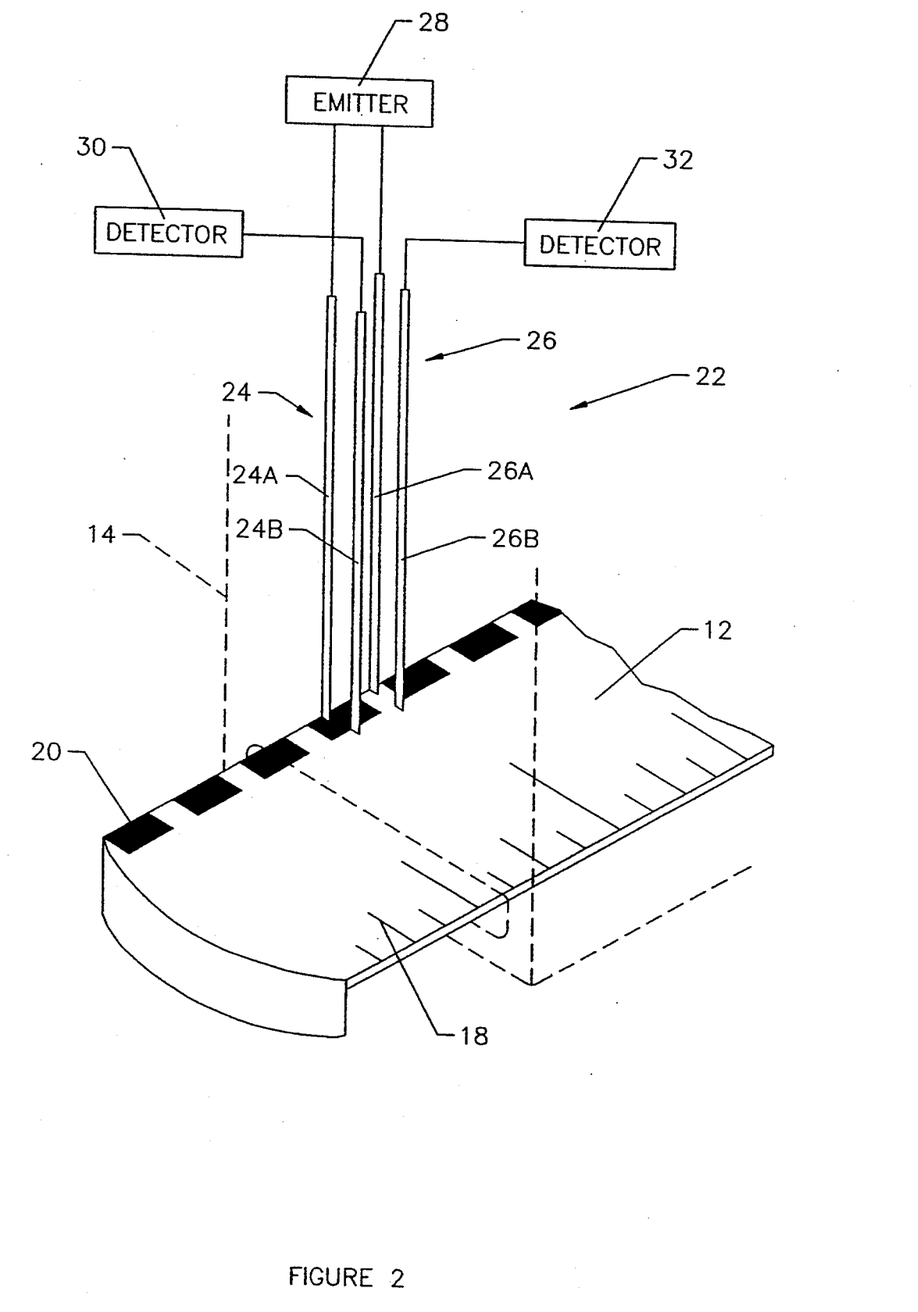
FIG. 2 is a schematic diagram illustrating the optical markings on the flexible rule and the photoelectric sensing means.

Referring now to FIG. 2, the photoelectric sensing means 22 for detecting the optical marks 20 is shown. The photoelectric sensing means 22 comprises two pairs 24 and 26 of optical fibers indicated by the numerals 24 and 26, a light emitter 28, and a pair of light detectors 30 and 32. Each optical fiber pair 24 and 26 comprises two separate optical fibers 24a, 24b, 26a, and 26b. Optical fibers 24a and 26a are connected to the light emitter 28. Optical fibers 24b and 26b are connected to respective light detectors 30 and 32. Optical fibers 24a and 26a transmit light from the emitter 28 which is reflected from the flexible rule 12. The reflected light is transmitted by optical fibers 24b and 26b to their corresponding detectors 30 and 32. The logic state of the detectors 30 and 32 alternate between "high" and "low" as the light and dark areas pass underneath each optical pair 24 and 26.

Figure 3:
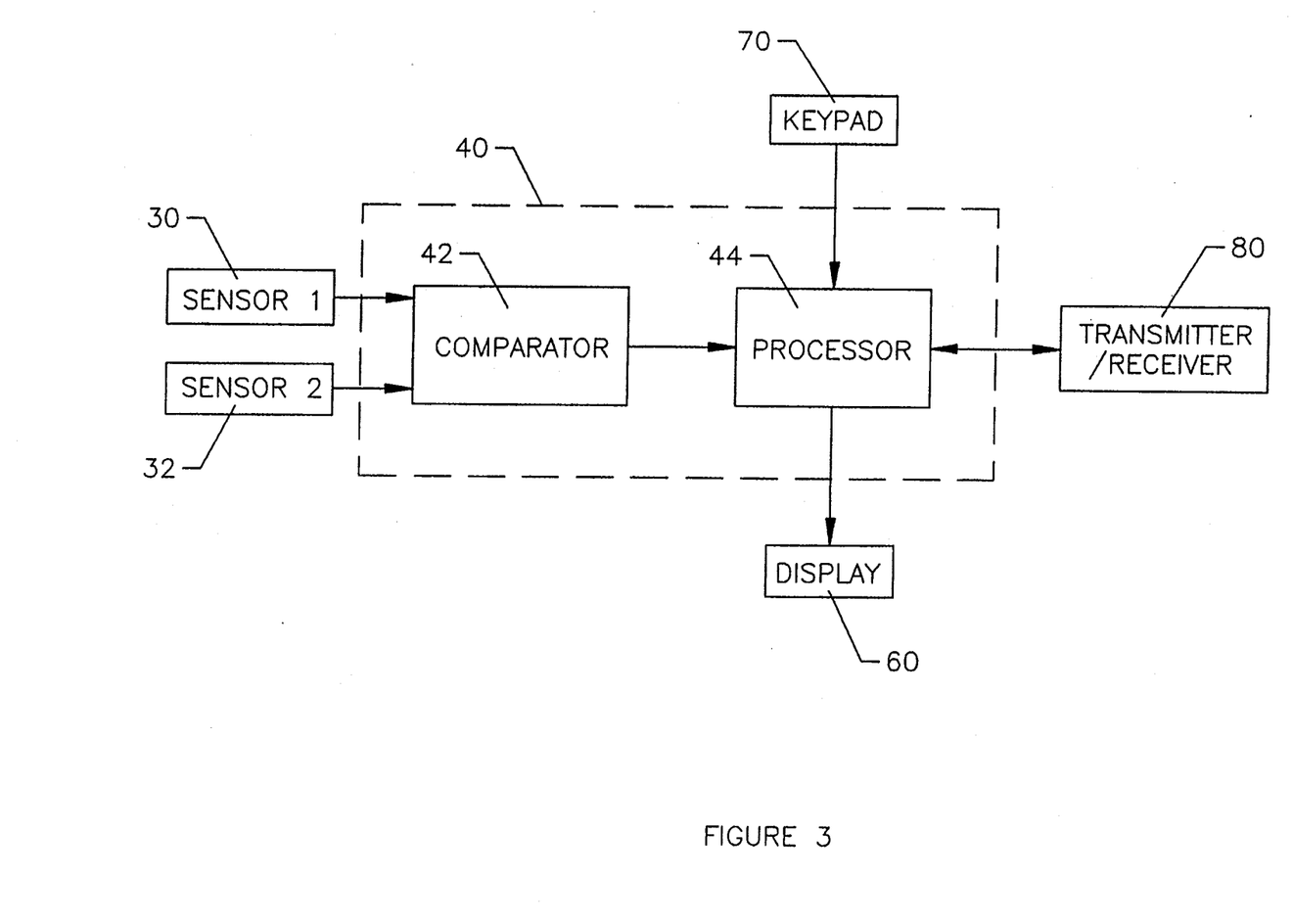
FIG. 3 is a block diagram illustrating the electronic components of the digital tape rule.

The signal from each detector 30 and 32 is applied to a logic circuit 40. The logic circuit 40 includes a comparator circuit 42 and a microprocessor 44. The comparator circuit 42 produces an "up" signal or a "down" depending upon the direction of movement of the flexible rule 12. The signal from the comparator circuit 42 is applied to the processor 44 which maintains a count indicative of the distance measured.

Figure 4:
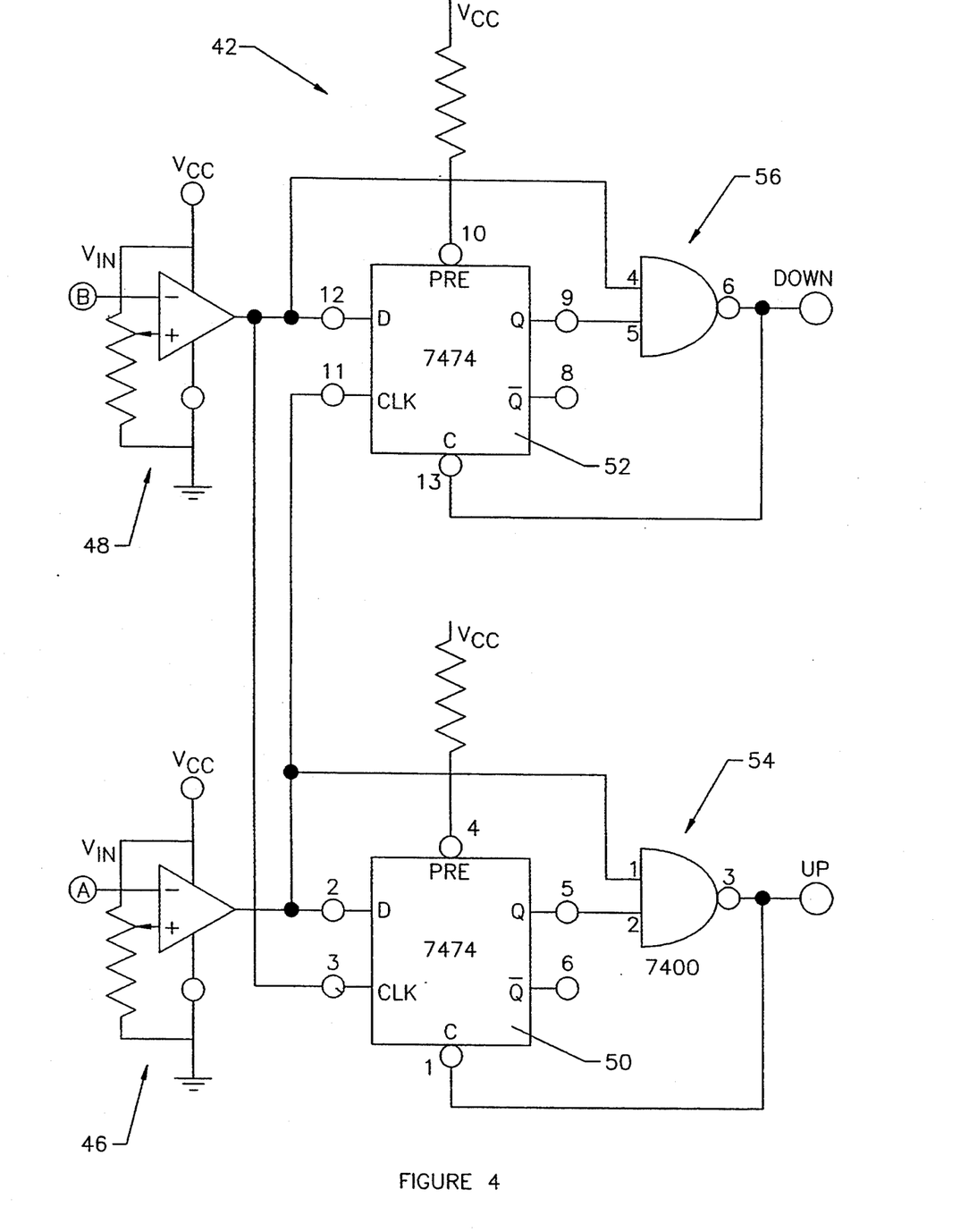
FIG. 4 is a circuit diagram of the comparator circuit of the logic circuit in the digital tape rule.

Referring now to FIG. 4, the comparator circuit 42 includes a pair of operational amplifiers 46 and 48, two flip-flops 50 and 52, and two NAND gates 54 and 56. The input signal from each detector 30 and 32 is amplified by a respective amplifier 46 and 48. The first input signal (A) from detector 30 is applied to the input (D) of the flip-flop 50 and to one-half of the NAND gate 54. The output signal (Q) from the flip-flop 50 is applied to the other half of the NAND gate 54. Similarly, the second input signal (B) from the detector 32 is applied to the input (D) of the flip flop 52 and to one-half of the NAND gate 56. The output signal (Q) from the flip-flop 52 is applied to the other half of the NAND gate 56. The flip-flops 50 and 52 are synchronous and operate with a clock signal so that the input signals are valid and the corresponding state transitions are initiated only during a specific portion of a clock signal. The second input signal serves as a clock signal for a flip-flop 50. Conversely, the first input signal serves as a clock signal for the flip-flop 52.

In operation, the comparator circuit 42 responds to the detection of the optical marks 20 to produce a pulse signal which is transmitted to the processor 44. The pulse signals can be either a "up" signal or a "down" signal depending on the direction the flexible rule 12 is moved. When the flexible rule 12 is extended, each optical mark 20 on the flexible rule 12 will be detected first by sensor 30 causing the detector 30 to go HIGH. The input signal from the detector 30 is amplified by the operational amplifier 46 and applied to the input (D) on the flip-flop 50 and half the NAND gate 54. The output (Q) on the flip-flop 50, which is passed to the other half of the NAND gate 54, remains LOW. When the optical mark 20 is detected by the second detector 32, the second detector will provide a logical HIGH. The flip-flop 50 is triggered by the rising pulse of the clock signal setting the output (Q) HIGH. The input signal from sensor 30 must be stable during a rising portion of the clock cycle. Thus, the detectors 30 and 32 must be spaced less than the minimum unit of measurement. When the output of the flip-flop 50 goes HIGH, the NAND gate 54 goes LOW since both inputs to the NAND gate 54 are HIGH. The output of the NAND gate 54 functions as an "up" signal which is applied to the processor 44. The output of the NAND gate 54 is also fed back to the flip-flop 50 to reset the flip-flop 50. As a result, the output of the NAND gate switches back and forth from HIGH to LOW to HIGH again as each mark 22 is detected, producing a pulsing "up" signal upon the passing of each mark 20.

When the line is retracted, the NAND gate 54 will remain in a steady state since the marks 22 will pass sensor 32 first. Since the output from sensor 30 is low, the rising pulse on sensor 32 will not change the value of the output (Q) on flip-flop 50, and the state of the NAND gate 54 will not change. Thus, no pulse would be generated on NAND gate 54.

The flip-flop 52 operates in the same manner. When the flexible rule 12 is retracted, the optical marks 20 are detected first by sensor 32 causing the output of sensor 32 to go HIGH. The input signal from sensor 32 is applied to one-half of the NAND gate 56 and to the input (Q) of the flip-flop 52. When the optical mark 20 is detected by sensor 30, the rising pulse of the clock signal triggers the flip-flop 52 setting the output (Q) HIGH. The output (Q) on the flip-flop 52 is applied to the other half of the NAND gate 56 causing the output of the NAND gate 56 to go LOW. When the NAND gate 56 goes low, the flip flop 52 is reset. This sequence is repeated each time a mark 22 passes from sensor 32 to sensor 30 creating a pulsing "down" signal which is applied to the processor 44.

The processor 44 is a general purpose processor having an internal, non-volatile memory. The processor 44 processes the "up" and "down" from the comparator circuit 42 to maintain a count indicative of the distance being measured. The output of the processor 44 is applied to a display 60, such as a liquid crystal display. The display 60 is mounted within the housing 14 where it is visible to the user. In the embodiment shown in FIG. 1, the display 60 is mounted in the top of the housing 14.

The tape measure 10 may also include an input means, such as a key pad 70, for entering data into the processor 44. The key pad 70 allows entry of data into the processor 44 which relates to the measurements being taken. For example, the key pad allows a number to be entered corresponding to each measurement taken. The number indicates the quantity of pieces needed of each measurement.

The key pad 70 comprises a plurality of numerical keys 72 and a plurality of function keys 74. The numerical keys 72 include one key for the digits 0-9, the decimal key (.), and the plus/minus (+/−) key. The function keys 74 comprise the keys in the last two columns as shown in FIG. 1. The function keys include the #key, the MITER key and the BEVEL key. The # key indicates the quantity of pieces needed of a particular measurement. The MITER key allows the user to associate a miter angle with a measurement. The BEVEL key allows the user to associate a bevel angle with a measurement.

The function keys also include the SEND key, the RESET key, the UP key (▲), and the DOWN key (▼). The measurements stored by the processor 44 can be transmitted by pressing the "SEND" key. When the "SEND" key is pressed, the processor 44 activates the transmitter 80 to transmit the data to a remote location. The RESET key is used to reset the count to zero. The UP and DOWN keys allow the user to scroll through the measurements stored in the processor's internal memory.

The digital tape measure is powered by a conventional DC battery (not shown) which is contained in housing 14. An on/off switch, seen in FIG. 1, allows the user to deactivate the digital tape measure 10 when it is not in use to preserve the battery. If desired, the digital tape measure could be powered by means of a solar cell.

Figure 5:
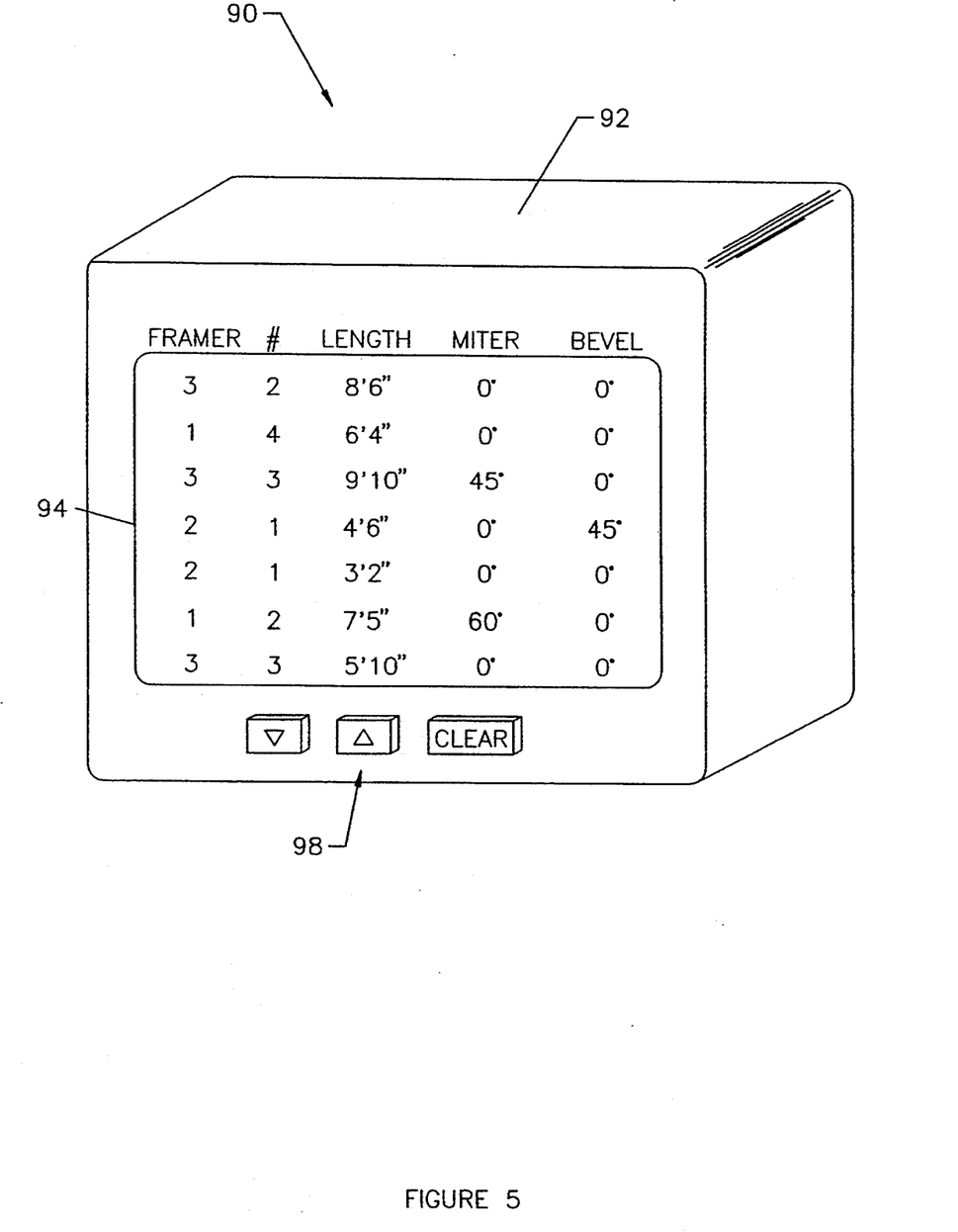
FIG. 5 is a perspective view of the display unit for receiving and displaying measurements transmitted to the remote location.
Figure 6:
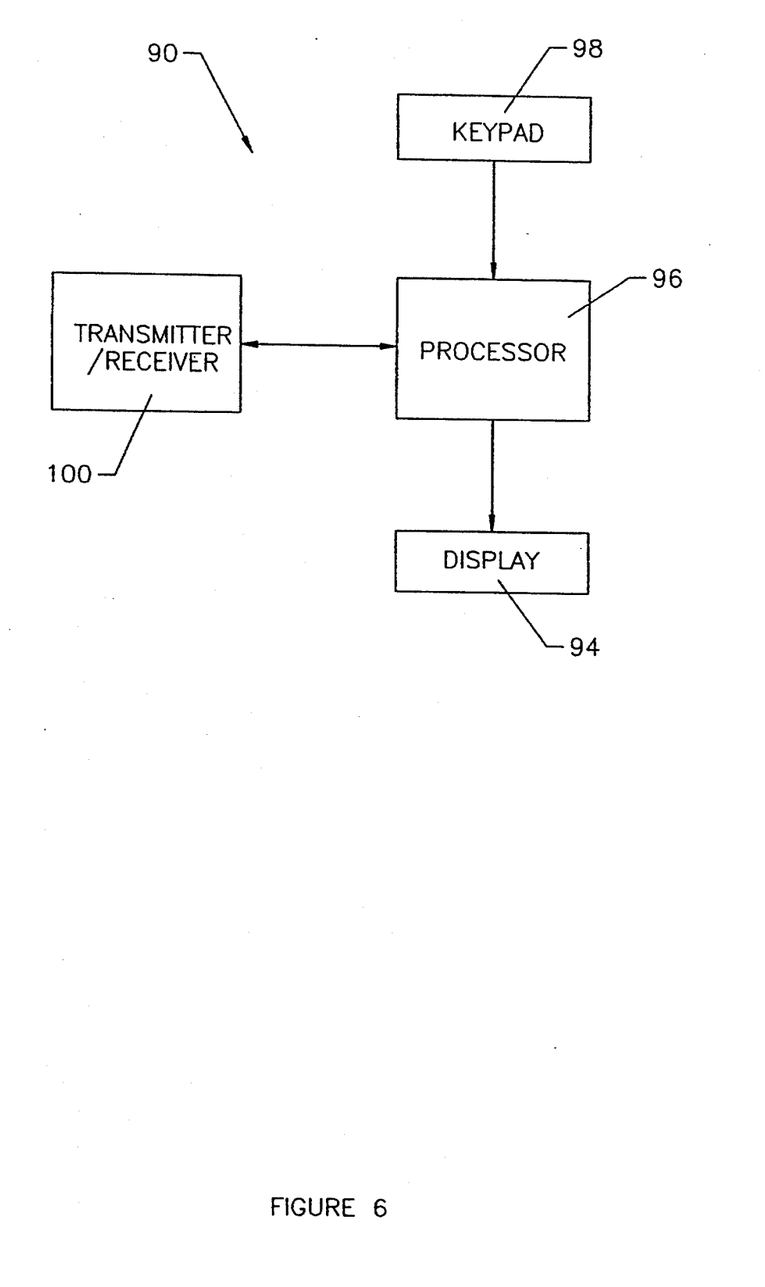
FIG. 6 is a block diagram of an automated control unit for a remote sawing station.

Referring now to FIGS. 5 and 6, a receiving unit 90 for receiving data at the remote location is shown. The receiving unit 90 is contained within a housing 92. The receiving unit 90 includes a receiver 100 for receiving measurements transmitted by the digital tape measure 10. The receiver 100 is operatively connected to a processor 96 having a non-volatile memory for storing the measurements. The receiving unit 90 also includes a display 94 for displaying measurements, and a keypad 98.

The display 94 is preferably large enough to allow a plurality of measurements to be displayed simultaneously. Each line of the display 94 corresponds to a single measurement. The display 94 displays the quantity, the length, the miter angle, and the bevel angle for each measurement. The keypad 98 includes UP and DOWN keys to allow the user to scroll through the list of measurements. A CLEAR key allows the user to delete the currently highlighted entry from the list.

The digital tape measure 10 of the present invention was used in substantially the same manner as a conventional tape measure. The tape 12 is extended from a first point A to a second point B to measure the distance between the two points. As the tape 12 is extended, the photoelectric sensor 22 detects the optical marks 20 along one edge of the tape. The logic circuit 40 maintains a count indicative of the longitudinal extension of the tape and the distance is displayed on the display 60. The measurement is stored in the processor's internal memory by pressing the "ENTER" key on the keypad 70. After the measurement is stored in the processor's memory, the measurement can be transmitted by pressing the "SEND" key on the keypad 70. When the "SEND" key is pressed, all measurements stored in the processor's internal memory are transmitted to the receiving unit 90. The measurements can be transmitted singly, or as a batch.

Data, such as the quantity, miter angle, or bevel angle, can also be associated with measurements. After the measurement is stored in the processor's memory, the number miter angle, and bevel angle are input by entering the numerical value for each parameter followed by the appropriate function key. For example, a miter angle of 45° can be entered by pressing "4", "5", "MITER" in that sequence. If no values are entered for the miter angle or the bevel angle, those values are automatically set to zero. The default value for the quantity parameter is "1."

In some instances, it may be desirable to reset the counter to zero when the tape 12 is partially extending. This can be accomplished by pressing the "RESET" key. When the "RESET" key is pressed, all measurements are made relative to the position of the tape 12 at the time the reset key was pressed.

As previously discussed, the measurements are transmitted to the receiving unit 90 when the "SEND" key is pressed. The receiving unit automatically stores the measurements in the processor's internal memory. The measurements are displayed on the display 94 on a first-in, first-out basis. The "UP" and "DOWN" keys enable the user to scroll through the entries. The "CLEAR" key deletes the currently highlighted measurement.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A measuring, transmitting, receiving, and sawing system for use by construction crews comprising:
   (a) a plurality of digital tape measures, each digital tape measure including a flexible tape having a series of optical markings moveable between a retracted position and an extended position sensing means for sensing said optical markings on said tape when the tape is extended or retracted, a logic circuit operatively connecting to the sensing means for providing digital signals representative of distances measured, and a transmitter for transmitting said digital signals to a sawing station at a remote location;
   (b) a receiving unit means disposed at said sawing station for receiving and storing said digital signals transmitted by said digital tape measures, said receiving unit means including a receiver for receiving said digital signals, data storage means operatively associated with said receiver for storing said digital signals, and display means for displaying measurements corresponding to each of said digital signals, whereby construction materials may be cut at said sawing station according to said measurements.

2. The measuring, transmitting, receiving, and sawing system of claim 1 wherein each digital tape measure further includes a display operatively connected to said logic circuit for displaying the distances measured.

3. The measuring, transmitting, receiving, and sawing system of claim 1 wherein each tape measure further includes data storage means for storing said measurements prior to transmitting said measurements to said receiving unit means.

4. The measuring, transmitting, receiving, and sawing system of claim 3 further including input means operatively connected to said logic circuit for entering data associated with said measurements stored in said data storage means of each tape measure.

5. The measuring, transmitting, receiving, and sawing system of claim 4 wherein said input means comprises a keypad and means for entering miter and bevel angles.

6. A method for taking and transmitting measurements at a construction site and for sawing construction materials, such as lumber, according to said measurements, comprising:

(a) providing a plurality of tape measures each tape measure including a flexible tape having a series of optical markings;

(b) sensing said optical markings during takings of measurements at the construction site;

(c) generating digital signals indicative of the distances measured based on the sensing of the optical markings;

(d) transmitting said digital signals from said tape measures to a sawing station at a remote location; and (e) sawing the construction materials according to the measurements.

7. The method of claim 6 further including the steps of receiving said digital signals at said remote location, and displaying measurements corresponding to said digital signals on a display at said remote location.

8. The method of claim 6 further including the step of storing measurements in a data storage means in each tape measure prior to transmitting said measurements to said remote location.

9. A measuring, transmitting, and receiving system for use at a construction site to measure and cut construction materials, the system comprising:

a) a plurality of tape measures, each tape measure including
  i) a flexible tape movable between a retracted position and an extended position,
  ii) sensing means for sensing distances measured when said flexible tape is extended or retracted,
  iii) a logic circuit operatively connected to said sensing means for providing signals representative of the distances measured, and
  iv) a transmitter for transmitting said signals to a remote location; and b) a receiving unit means at said remote location, said receiving unit means including
  i) a receiver for receiving said signals transmitted by said plurality of tape measures,
  ii) data storage means operatively associated with said receiver for storing said signals, and
  iii) display means for displaying measurements corresponding to said signals, whereby construction materials may be cut at said remote location according to the measurements displayed.

* * * * *